(12) United States Patent
Lindegaard et al.

(10) Patent No.: US 11,345,018 B2
(45) Date of Patent: May 31, 2022

(54) PROGRAMMABLE ROBOT FOR EDUCATIONAL PURPOSES

(71) Applicant: KUBO Robotics ApS, Odense SØ (DK)

(72) Inventors: Daniel Friis Lindegaard, Odense C (DK); Tommy Schou Lund Otzen, Odense C (DK)

(73) Assignee: KUBO Robotics ApS

( * ) Notice: Subject to any disclaimer, the term of this patent is extended or adjusted under 35 U.S.C. 154(b) by 487 days.

(21) Appl. No.: 16/323,176

(22) PCT Filed: Aug. 11, 2017

(86) PCT No.: PCT/EP2017/070478
§ 371 (c)(1),
(2) Date: Feb. 4, 2019

(87) PCT Pub. No.: WO2018/029354
PCT Pub. Date: Feb. 15, 2018

(65) Prior Publication Data
US 2021/0299852 A1     Sep. 30, 2021

(30) Foreign Application Priority Data
Aug. 12, 2016 (EP) ..................... 16184033

(51) Int. Cl.
*B25J 13/08* (2006.01)
*B25J 9/00* (2006.01)
(Continued)

(52) U.S. Cl.
CPC ............. *B25J 9/0003* (2013.01); *B25J 5/007* (2013.01); *B25J 9/0009* (2013.01); *B25J 9/1656* (2013.01); *B25J 11/0005* (2013.01); *B25J 13/08* (2013.01)

(58) Field of Classification Search
CPC ........ B25J 13/08; B25J 9/0003; B25J 9/1656; B25J 11/0005; B25J 9/0009; B25J 5/007;
(Continued)

(56) References Cited

U.S. PATENT DOCUMENTS

| 7,324,873 B2 * | 1/2008 | Nagatsuka | ............. | B23K 26/04 700/245 |
| 8,346,390 B2 | 1/2013 | Ruan et al. | | |

(Continued)

FOREIGN PATENT DOCUMENTS

| CN | 101590323 A | 12/2009 |
| CN | 202490439 U | 10/2012 |

(Continued)

OTHER PUBLICATIONS

Jian et al., Real-time measure and control system of biped walking robot based on sensor, 2013, IEEE, p. 1429-1434 (Year: 2013).*

(Continued)

*Primary Examiner* — McDieunel Marc
(74) *Attorney, Agent, or Firm* — Condo Roccia Koptiw LLP (57) ABSTRACT

A programmable robot for educational purposes comprising a body comprising a drive system for causing the robot to move, an information acquisition device configured to acquire information from an external information carrying element, and a first connection element, and a head comprising a control system with a data storage element and a processor element being configured to receive a data signal transmitted from the at least one information acquisition device, the data signal comprising the acquired information from the external information carrying element, to process the data signal to interpret the information and achieve instructions, and to cause the drive system to move the robot in accordance with the instructions, and a second connection (Continued)

element, where the body and the head are adapted to be detachably coupled to one another by connecting the first connection element and the second connection element to one another.

19 Claims, 4 Drawing Sheets

(51) Int. Cl.
    *B25J 5/00*     (2006.01)
    *B25J 9/16*     (2006.01)
    *B25J 11/00*     (2006.01)

(58) Field of Classification Search
    CPC .... A63H 33/005; A63H 17/395; A63H 11/10; A63H 2200/00; G09B 19/00; G09B 5/06; G09B 1/325; G05B 19/0426; F41H 7/005; F41H 11/16; F41H 13/0062; G05D 1/0022; G05D 1/0038; G05D 2201/0209
    See application file for complete search history.

(56) References Cited

U.S. PATENT DOCUMENTS

| | | | |
|---|---|---|---|
| 9,370,862 B2 | 6/2016 | Gupta et al. | |
| 2007/0166004 A1 | 7/2007 | Kim | |
| 2011/0199194 A1 | 8/2011 | Waldock et al. | |
| 2013/0078600 A1 | 3/2013 | Fischer et al. | |
| 2014/0099613 A1 | 4/2014 | Krauss et al. | |
| 2014/0297035 A1 | 10/2014 | Bers et al. | |
| 2015/0080125 A1 | 3/2015 | Andre et al. | |
| 2016/0318187 A1* | 11/2016 | Tan | B25J 13/084 |
| 2017/0066128 A1* | 3/2017 | Gildert | B25J 9/1679 |
| 2017/0255301 A1* | 9/2017 | Norton | G06F 3/011 |
| 2017/0269607 A1* | 9/2017 | Fulop | B25J 13/006 |
| 2017/0320210 A1* | 11/2017 | Ding | B25J 9/1656 |
| 2018/0154525 A1* | 6/2018 | Tan | B25J 13/084 |

FOREIGN PATENT DOCUMENTS

| | | |
|---|---|---|
| CN | 103824506 A | 5/2014 |
| CN | 204926661 U | 12/2015 |
| CN | 105498228 A | 4/2016 |
| GB | 2 513 088 A | 10/2014 |
| JP | S57-54499 U | 3/1982 |
| JP | 2003-001578 A | 1/2003 |
| JP | 2005-066745 A | 3/2005 |
| KR | 10-2004-0061903 A | 7/2004 |
| KR | 10-2016-0000681 U | 3/2016 |
| KR | 10-2016-0076158 A | 6/2016 |
| WO | 2013/183328 A1 | 12/2013 |
| WO | WO 2016/013927 A1 | 1/2016 |

OTHER PUBLICATIONS

Fernandez et al., A Distributed Multirobot System Based On Edutainment Robots, 2005, IEEE, p. 4260-4265 (Year: 2005).*
Sakurai et al., Development of motion instruction system with interactive robot suit HAL, 2009, IEEE, p. 1141-1147 (Year: 2009).*
Mizukawa et al., Multi-modal information-sharing teaching system in sensor-based robotics $structured description based on task properties that enables onsite-tuning by reflecting skills, 2002, IEEE, pg. (Year: 2002).*
Limosani Raffaele et al: "Enabling Global Robot Navigation Based on a Cloud Robotics Approach", International Journal of Social Robotics, Springer Netherlands, Dordrecht, vol. 8, No. 3, Mar. 22, 2016 (Mar. 22, 2016), pp. 371-380, XP035989638, ISSN: 1875-4791, DOI: 10.1007/S12369-016-0349-8.

* cited by examiner

PROGRAMMABLE ROBOT FOR EDUCATIONAL PURPOSES

CROSS REFERENCE TO RELATED APPLICATIONS

This application is the National Stage Entry under 35 U.S.C. § 371 of Patent Cooperation Treaty Application No. PCT/EP2017/070478, filed 11 Aug. 2017, which claims priority from European Application No. 16184033.5, filed 12 Aug. 2016, the contents of which are hereby incorporated by reference herein.

TECHNICAL FIELD

The present invention relates to a programmable robot for educational purposes, and particularly for educating children at school or elsewhere. More particularly the present invention relates to a programmable robot for educational purposes comprising a body and a head.

As used herein the term "information" is intended to encompass both instructions directly executable on a processor element and information usable to identify specific instructions executable on a processor element.

As used herein the term "information carrying element" is intended to encompass any feasible element adapted to directly or indirectly carry information, non-limiting examples being cards, blocks and the like with or without a separate data carrier, tag, bar code or the like arranged thereon or therein.

As used herein the term "information acquisition device" is in the broadest sense intended to encompass any device capable of acquiring, e.g. reading or sensing, information provided on an information element Also, as used herein the terms "topic" and "educational topic" are intended to encompass any feasible topic or subject in which it may be desire to educate students, non-limiting examples being languages, mathematics and science, as well as sub-topics, non-limiting examples of sub-topics of the topic mathematics being addition, subtraction, multiplication, division and fractions.

BACKGROUND ART

Robots for educational purposes are well known, especially for the purpose of teaching children with no or little previous knowledge of programming languages how to program computers.

US 2011/0199194 A1 describes a programmable walking robot comprising a body with legs, arms and a head, a controller, an output device and a information acquisition device being arranged in the body. The robot is programmed by means of providing and arranging in a desired order a number of carriers, each comprising one or more instructions and each comprising a transmission tag, and subsequently letting the robot read the transmission tags by means of the information acquisition devices and execute the thus read instructions by means of the controller.

However, there is still a desire in the art to provide a robot for educational purposes which is simple and quick, especially for smaller children having no or little experience with programming, to operate and program as well as to make ready for education in a given topic, and which is thus easy to use for several different education topics. Furthermore, as educational institutions often have limited funds, it is desired to provide such a robot which furthermore is cheap to procure.

SUMMARY OF THE INVENTION

In light of the above it is therefore an object of the invention to develop and provide a robot for educational purposes which is simple and quick, even for small children, to make ready for education in a given topic, and which is also both simple and cheap to produce and cheap to procure.

Furthermore, it is an object of the invention to provide a robot for educational purposes with which, when made ready for education in a given topic, it is simple and easy to identify the topic, to which the robot is made ready.

A further object of the invention to provide a robot for educational purposes which is simple and straight forward to use, especially for small children not necessarily having technical insight.

These and other objects are in a first aspect if the invention solved by means of a robot for educational purposes comprising a body comprising a drive system adapted for, in operation, causing said robot to move, at least one information acquisition device configured to acquire information from an external information carrying element, and a first connection element, and a head comprising a control system, the control system comprising a data storage element and a processor element, the processor element being configured to receive a data signal transmitted from the at least one information acquisition device, the data signal comprising the acquired information from the external information carrying element, to process the data signal, where required using data stored in the data storage element, to interpret the information and achieve one or more instructions, and to cause the drive system to move the robot in accordance with the one or more instructions, and a second connection element, where the body and the head are adapted to be detachably coupled to one another by connecting the first connection element and the second connection element to one another.

By providing such a robot, and particularly by providing the robot with a head and a body adapted to be detachably coupled to one another by connecting the first connection element of the body and the second connection element of the head to one another, a robot which is simple and quick, even for small children, to make ready for education in a given educational topic by simply mounting the head on the body, or if necessary by exchanging the head of the robot, is provided.

Furthermore, such a robot is simple and cheap to produce, and thus also cheap to procure.

In an embodiment the programmable robot further comprises a plurality of interchangeable heads, each of the plurality of heads comprising a data storage element and a processor element, the processor element being configured to receive a data signal transmitted from the at least one information acquisition device, the data signal comprising the acquired information from the external information carrying element, to process the data signal, where required using data stored in the data storage element, to interpret the information and achieve one or more instructions, and to cause the drive system to move the robot in accordance with the one or more instructions, and a second connection element, and the body and each of the plurality of heads are adapted to be detachably coupled to one another by connecting the first connection element and the second connection element to one another.

When procuring such a robot only one body for each plurality of heads need to be acquired. Thus, such a robot is particularly cheap to procure.

Furthermore, with such a robot for educational purposes it is, when the robot is made ready for education in a given topic, simple and easy to identify the topic, to which the robot is made ready. Furthermore, it is also simple and easy for the students to identify which head is configured to which topic, and thus the robot may be made ready in a simple and fast manner. Thereby, a minimum of the lesson available is used making the students ready for education in a given topic.

In an embodiment the processor element of the head or of each head of a plurality of interchangeable heads of the robot is furthermore configured to send and/or write information to the external information carrying element by sending a data signal comprising the information to the at least one information acquisition device, which in turn sends the data signal to the external information carrying element. Thereby a robot is provided with which the information carried by the external information carrying element may be altered.

In an additional embodiment, the head or each head of a plurality of interchangeable heads may comprise a marking or a tag or the like, or even a certain shape, colour or form, thereby making it possible for the user, such as a school child, to readily identify each head as being configured for a certain education topic.

In an embodiment the data storage element of the control system of the head of the robot comprises data stored thereon relating to a predetermined education topic.

In an embodiment the data storage element of the control system of each of the plurality of heads comprises information stored thereon relating to a predetermined education topic.

When procuring such a robot only one body, not only for each plurality of heads, but also for a plurality of educational topics, need to be acquired. Thus, such a robot is particularly cheap to procure, especially for educational institutions such as primary and secondary schools.

In an embodiment the first connection element and the second connection element are configured and arranged such that the head may be mounted in only one pre-determined orientation on the body.

Thereby it is ensured that the head cannot be mounted on the body in an erroneous manner. Such a robot is thus particularly simple to assemble and make ready for use, especially for small children.

In a further embodiment one of the first connection element and the second connection element comprise at least one magnet, and wherein the other of the first connection element and the second connection element comprises a metallic element attracted to magnets and/or at least one magnet Alternatively, the first connection element and the second connection element are mutually matching male and female components of a snap locking or click locking or frictionally locking connection.

Thereby it is ensured that the head and the body are connectable and detachable in a particularly simple manner. With such a robot, the exchange of one head with another, e.g. between classes or topics, is thus particularly simple and straight forward, especially for small children.

In an embodiments the robot further comprises an electrical energy source for supplying an electrical current to the control system, the body further comprises electrical circuitry, the head further comprises electrical circuitry, and the electrical circuitry of the body and the electrical circuitry of the head is configured in such a way that an electrical current from the electrical energy source is caused to flow through at least a part of the electrical circuitry of the head and through at least a part of the electrical circuitry of the body before being delivered to the control system.

Thereby it is ensured that the robot cannot be turned on and thus move before the electrical connection, and depending on the construction also the mechanical connection, between head and body is established. This in turn provides an enhanced security of the robot.

In an embodiment the body further comprises a set of wheels arranged on mutually opposite sides of the body of the robot and coupled to the drive system, and wherein the information acquisition device is arranged between the set of wheels on an underside of the body of the robot such as to enable the information acquisition device to scan an area between the set of wheels below the underside of the body of the robot.

Thereby a programmable robot is provided with which the process of making the robot scan a sequence of external information carrying elements, and thus of programming the robot, is made very simple in that the robot is simply placed with one wheel on each side of the first information carrying element to be scanned, whereby the information acquisition device will automatically and inevitably scan and thus acquire the information from the information carrying element. Such a robot is thus particularly simple to operate and program, especially for small children.

In an embodiment the information acquisition device comprises a sensor device. Alternatively or additionally, the information acquisition device comprises a near field communication device.

In an embodiment the head comprises a feedback device. The feedback device may provide feedback being any one or more of tactile, visual or auditive.

Tactile feedback may for instance be given by the feedback device causing a part of the head of the robot to move or vibrate. Visual feedback may for instance be a light signal, in which case the feedback device may be a light emitting device, for instance be provided to look as eyes of the robot. Auditive feedback may for instance be a sound signal or a sequence of sound signals, in which case the feedback device may be provided as a loudspeaker, for instance provided and arranged to give the impression of the robot speaking.

In any event the provision of a feedback device enables providing the user with proper guidance during the educational process, such as indicating whether the robot is assembled and/or operated correctly and whether answers to questions posed are correct or not.

The above and other objects are in a second aspect of the invention solved by means of an educational kit comprising at least one group of information carrying elements comprising information and a programmable robot for educational purposes according to the first aspect of the invention and comprising any one or more of the features described above and in the below detailed description.

In an embodiment of the educational kit the at least one group of information carrying elements comprise information relating to a given education topic.

In an embodiment the educational kit further comprises a plurality of groups of information carrying elements, and each group of information carrying elements comprise information relating to a given education topic.

Thereby, a head and a group of information carrying elements comprise information relating to a given education topic may be chosen to provide a fully functional educational kit for a given learning purpose.

In an embodiment of the educational kit the body of the robot further comprises a set of wheels coupled to the drive system and arranged on mutually opposite sides of the robot and spaced apart with a distance being any one of larger than a width of the information carrying elements of the at least one group of information carrying elements, equal to a width of the information carrying elements of the at least one group of information carrying elements, or smaller than a width of the information carrying elements of the at least one group of information carrying elements, such as equal to the width of the information carrying elements of the at least one group of information carrying elements minus the combined thickness of the set of wheels, and the information acquisition device is arranged between the set of wheels on an underside of the body such as to enable the information acquisition device to scan an area between the set of wheels below the underside of the robot.

In addition the above-mentioned advantages, with such an educational kit the robot will when the distance is larger than or equal to the width of the information carrying elements not drive on the information carrying elements during scanning thereof. This in turn improves the stability of the robot during operation as well as the durability of the information carrying elements.

In addition the above-mentioned advantages, with such an educational kit where the distance between the wheels of the robot is equal to the width of the information carrying elements of the at least one group of information carrying elements minus the combined thickness of the set of wheels, it becomes possible to make the robot more compact and thus save materials, without compromising the advantages related to providing the information acquisition device between the set of wheels on an underside of the body of the robot as described above.

In an embodiment of the educational kit each information carrying element of the at least one group of information carrying elements comprise a tag, and the information acquisition device of the robot comprises a near field communication device configured to register the tag.

Examples of suitable tags include, but are not limited to, RFID-tags, bar codes and QR-codes. Likewise, examples of suitable near field communication devices include, but are not limited to, RFID-tag readers, bar code readers and QR-code readers. RFID-tags and RFID-tag readers have the particular advantage of enabling the robot to both read information from and write information to the information carrying element(s).

The tags may comprise information configured to enable the processor element of the robot to identify one or more instructions based on the information, typically in the form of suitable program code, and/or information configured to distinguish the information carrying element and/or the type of information carrying element within the at least one group of information carrying elements.

In an embodiment of the educational kit the tags are adapted for receiving information such as to allow the robot to write information to the tags by means of the information acquisition device.

In an embodiment of the educational kit the information acquisition device of the robot comprises a sensor element, and each information carrying element of the at least one group of information carrying elements comprise information measurable by the sensor element and configured to enable the processor element of the robot to identify one or more instructions based on the information and/or to distinguish the information carrying element and/or the type of information carrying element within the at least one group of information carrying elements.

Examples of suitable sensor elements include, but are not limited to, colour sensors and OCR sensors. Likewise, examples of suitable information measurable by the sensor element and provided on the information carrying elements include, but are not limited to, different colours indicating different instructions and text suitable for recognition by an OCR sensor.

Further embodiments of both the programmable robot according to the first aspect of the invention and of the educational kit according to the second aspect of the invention appear from the below detailed description as well as from the respective dependent claims.

BRIEF DESCRIPTION OF THE DRAWINGS

The invention will now be described in more detail below by means of a non-limiting example of a presently preferred embodiment and with reference to the schematic drawings, in which.

DETAILED DESCRIPTION OF EMBODIMENTS

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1A:
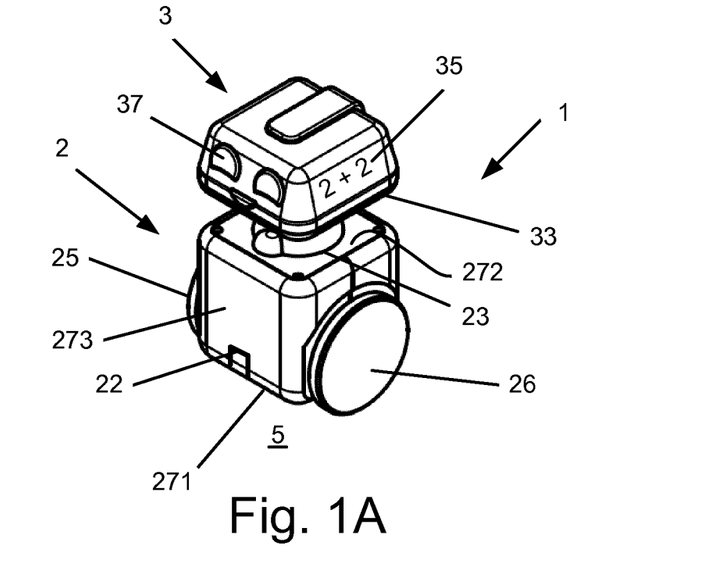
FIGS. 1A, 1B and 1C shows a schematic perspective, front and side view, respectively, of a programmable robot for educational purposes according to the first aspect of the invention and comprising a body and a head selected from a plurality of interchangeable heads, which are also illustrated.
Figure 1B:
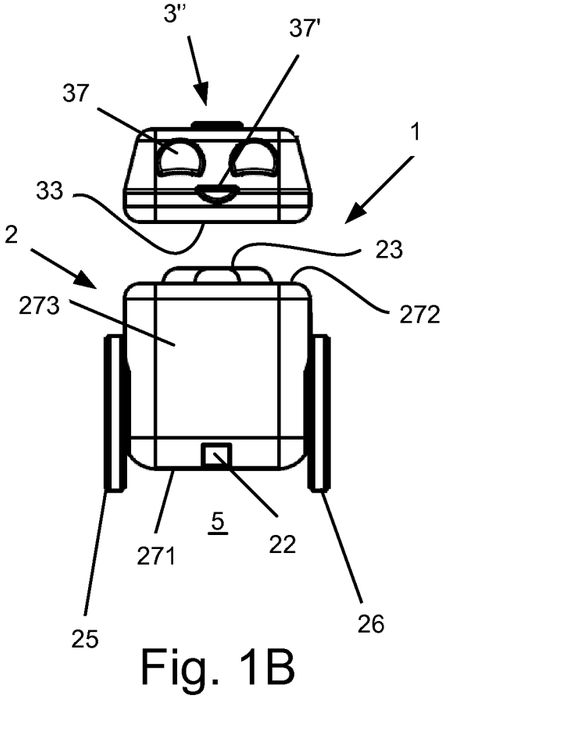
Figure 1C:
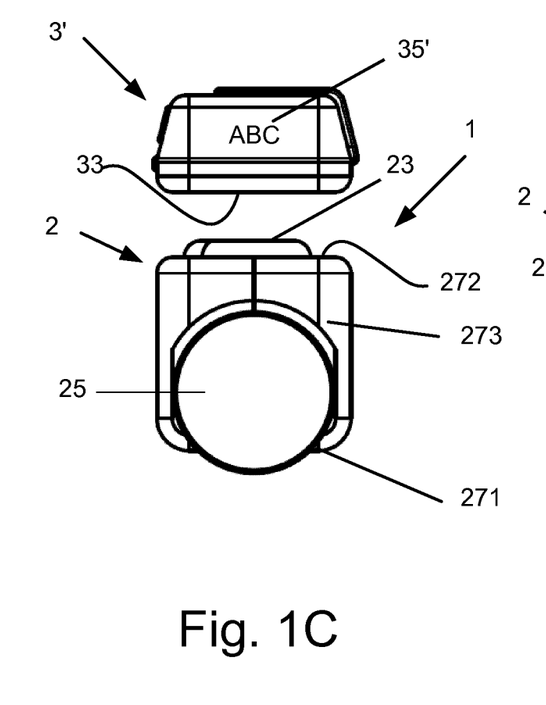

Referring first to FIGS. 1A, 1B and 1C, a programmable robot 1 for educational purposes according to the invention is shown. The robot 1 generally comprises a body 2 and a head 3.

The body 2 comprises an information acquisition device 22 for acquiring information from an external information carrying element 101-105 (cf. FIGS. 5 and 6), wheels 25, 26 and an underside 271. The information acquisition device 22 may be or comprise a sensor device and/or a near field communication device. In the embodiment shown, information acquisition device 22 is connected to or mounted on or in connection with the underside 271 of the body 2, but may in other embodiments be arranged or mounted on another part of the body 2 or even on the head 3. When the information acquisition device 22 is connected to or mounted on the underside 271 of the body 2, the information acquisition device 22 is enabled to scan an area 5 between the set of wheels 25, 26 below the underside 271 of the body 2.

The set of wheels 25, 26 are connected to opposite sides of the surface or side 273 connecting the underside 271 and top side 272 of the body 2. The information acquisition device 22 is thus arranged between the wheels 25 and 26 on the underside 271 of the body 2.

The set of wheels 25, 26 are in the embodiment shown arranged spaced apart with a distance D (cf. FIG. 6) being larger than the width of an external information carrying element 101-105. Alternatively, the set of wheels 25, 26 may be arranged spaced apart with a distance D (cf. FIG. 6) being equal to or even smaller than the width of an external information carrying element 101-105, such as the width of an external information carrying element 101-105 minus the combined thickness of the wheels 25 and 26, the latter possibility enabling the robot to drive on opposite edges of the external information carrying element 101-105. Typically, the distance between the wheels 25 and 26 is in the order of 3-5 cm. In the embodiment shown two wheels 25 and 26 are provided although more than two wheels, e.g. four wheels, may also be provided.

Figure 4A:
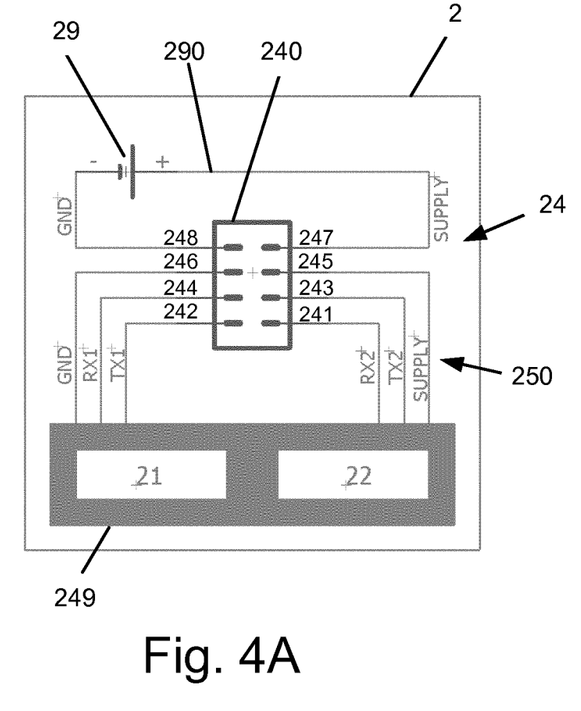

With reference also to FIG. 4 the body 2 further comprises a drive system 21 adapted for, in operation, causing the wheels 25, 26 of the body 2 of the robot 1 and thereby the robot 1 to move, as well as electrical circuitry 24. The wheels 25 and 26 are thus connected to the drive system 21. The drive system 21 may for instance be one or more electric motors, such as a stepper motor.

Figure 4B:
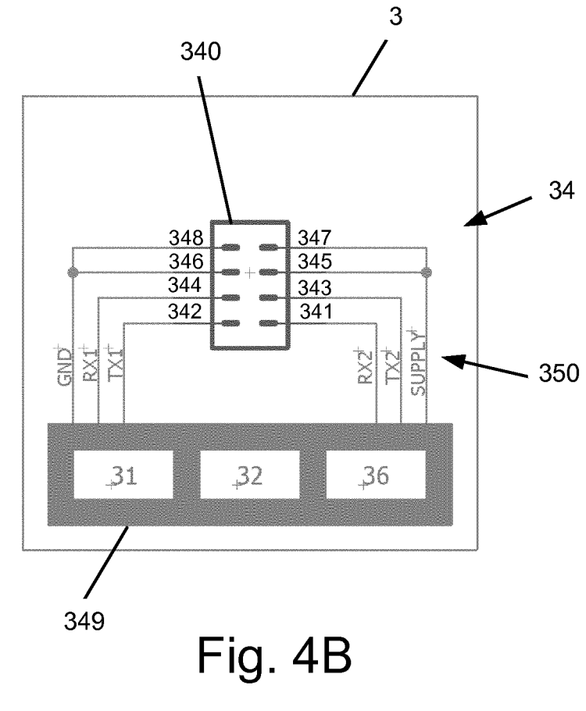

With reference also to FIG. 4 the head 3 comprises a control system 31. The control system 31 comprises electrical circuitry 34, a data storage element 32 and a processor element 36.

The processor element 36 is configured to receive a data signal transmitted from the at least one information acquisition device 22, the data signal comprising the acquired information from the external information carrying element 101-105, to process the data signal, if necessary using data stored in the data storage element 32 during the processing of the data signal, to interpret the information and achieve one or more instructions, and to cause the drive system 21 to move the wheels 25, 26 and thus the robot 1 in accordance with the one or more instructions.

The processor element 36 may furthermore be configured to send and/or write information to the external information carrying element 101-105 by sending a data signal comprising the relevant information to the at least one information acquisition device 22 of the body 2 of the robot 1, which in turn sends the data signal comprising the relevant information to the external information carrying element 101-105.

The head 3 further comprises a feedback device 37, which in the embodiment shown in FIG. 1A is configured to look like an eye 37 of the robot 1 and is a feedback device adapted to send out an optical feedback signal. Alternatively or additionally, as shown on FIG. 1B, the head 3' may also comprise a feedback device 37', which is configured to look like a mouth 37' of the robot 1 and is a feedback device adapted to send out an acoustic feedback signal.

The data storage element 32 of the control system 31 of the head 3 may further comprise data stored thereon relating to a predetermined education topic. In such an embodiment the head 3 may further comprise a marking 35 adapted to identify the said predetermined education topic.

The body 2 and the head 3 are adapted to be detachably coupled to one another. To this end the body 2 comprises a first connection element 23 and the head 3 comprises a second connection element 33, the first connection element 23 and the second connection element 33 being connectable to one another. The first connection element 23 is arranged on a top side 272 of the body 2 opposite to the underside 271. The second connection element 33 is arranged on an underside of the head 3.

As the head 3 may thus be detached from and attached to the body 2, the robot may in some embodiments comprise a plurality of interchangeable heads 3, 3', 3". In such an embodiment, each of the plurality of heads 3, 3', 3" is constructed and configured as described above. Also, the data storage element 32 of the control system 31 of each of the plurality of heads 3, 3', 3" may comprise information stored thereon relating to a predetermined education topic, such that each of the plurality of heads may be made ready for a different predetermined education topic. Each of the plurality of heads 3, 3', 3" may further comprise a (different) marking 35 adapted to identify the said predetermined education topic. For instance, in FIG. 1A the marking 35 of the head 3 reading "2+2" identifies the relevant topic as mathematics, while in FIG. 1B the marking 35' of the head 3' reading "ABC" identifies the relevant topic as spelling.

Figure 2:
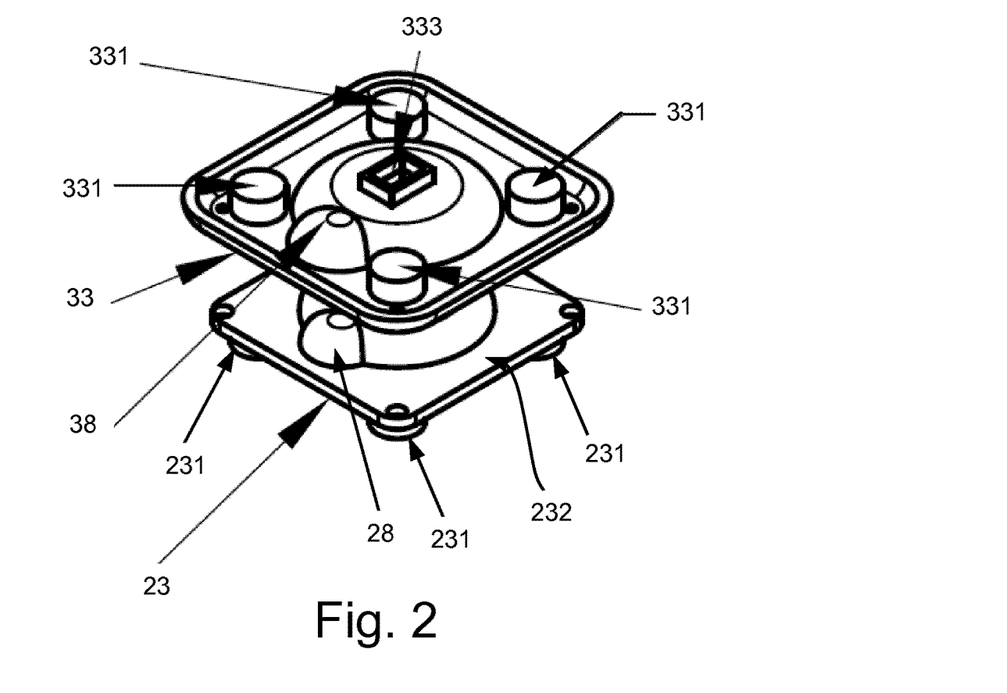
FIG. 2 shows a schematic perspective view of an embodiment of the connection elements for connecting the body and the head of the robot according to FIG. 1.
Figure 3:
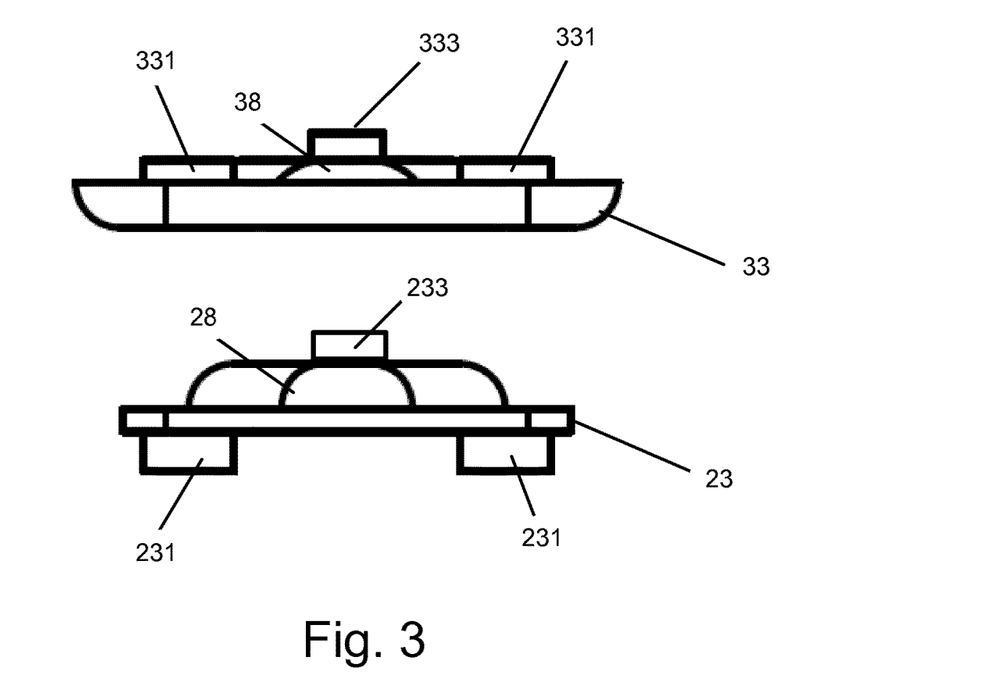
FIG. 3 shows a schematic side view of the connection elements of FIG. 2 for connecting the body and the head of the robot according to FIG. 1, FIGS. 4A and 4B show a schematic diagram illustrating the electrical circuitry of the body and the head, respectively, of the robot according to FIG. 1.

Referring now to FIGS. 2 and 3, the connection between the body 2 and the head 3, or each head 3, or in other words the first connection element 23 and the second connection element 33, will be described in further detail.

The first connection element 32 and the second connection element 33 are configured and arranged such that the head 3 or each head 3 may be mounted in only one pre-determined orientation on the body 2 of the robot 1.

For instance, as shown in FIG. 3, the first connection element 32 comprises four magnets 321 and the second connection element 33 likewise comprises four magnets 331. Other numbers of magnets 321, 331, such as one, two three or more than four is also feasible. The respective magnets 321 and 331 may be oriented such that the head 3 or each head 3 can be mounted in only one pre-determined orientation on the body 2. For instance the respective magnets 321 and 331 may be oriented with their respective poles pointing in such a direction with respect to one another that at least one magnet 321 on the body 2 and at least one magnet 331 on the head 3 will only attract one another when it is attempted to mount the head 3 in the one pre-determined orientation on the body 2.

As is also indicated in FIG. 2 the first connection element may also, in addition or in an alternative to the magnets 321, comprise a metallic element 232 attracted to magnets. The same may in other embodiments, where the first connection element 32 comprises at least one magnet 321, apply to the second connection element 33.

For instance the head 3 may comprise one magnet 331 and the body may comprise one metallic element 232, the magnet 331 and the metallic element 232 being arranged in such a respective position, that they can only be brought into connection when it is attempted to mount the head 3 in the one pre-determined orientation on the body 2.

In an alternative or additional embodiment, the first connection element 32 and the second connection element 33 comprise mutually matching male and female components 323 and 333, respectively, of a snap locking or click locking or frictionally locking connection. For instance, as illustrated in FIGS. 2 and 3, the first connection element 32 comprises a spring loaded connector 233, and the second connection element 33 comprises a socket 333 for the spring loaded connector 233. The male and female components 233 and 333, respectively, may for instance be shaped in such a way, for instance by being provided with a suitable asymmetric shape, that they can only be brought into connection with one another when it is attempted to mount the head 3 in the one pre-determined orientation on the body 2.

In a further alternative or additional embodiment, the first connection element 32 and the second connection element 33 may comprise mutually matching elements, such as dents 28 and 38, respectively, adapted and configured to avoid the risk of displacement of the head 3 during connection to and after connection with the body 2. In principle, the dents 28 and 38 or other mutually matching elements may alternatively or additionally be arranged, configured and/or shaped such that they ensure that the head 3 or each head 3 may be mounted in only one pre-determined orientation on the body 2.

Referring now to FIGS. 4A and 4B, the electrical circuitry 24 of the body 2 (FIG. 4A) and the electrical circuitry 34 of the head 3 (FIG. 4B) is shown and will be described in further detail.

As shown on FIG. 4A, the electrical circuitry 24 of the body 2 generally comprises a body connector 240 with electrical connection elements 241-248, a body main circuit 249 and a RX/TX circuit 250 connecting the body connector 240 and the body main circuit 249.

The body main circuit 249 comprises the drive system 21 and the information acquisition device 22.

In the RX/TX circuit 250: Connection element 241 and body main circuit 249 is connected by line RX2; connection element 242 and body main circuit 249 is connected by line RX1; connection element 243 and body main circuit 249 is connected by line TX2; connection element 244 and body main circuit 249 is connected by line TX1; connection element 245 and body main circuit 249 is connected by a supply line, SUPPLY; and connection element 246 and body main circuit 249 is connected by a grounded line, GND.

The electrical circuitry 24 of the body 2 further comprises an electrical energy supply 29 in the form of a battery connected to the electrical connection elements 247 and 248 of the body connector 240 by means of a battery circuit 290. Connection element 247 and electrical energy supply 29 is connected by a supply line, SUPPLY, of the battery circuit 290. Connection element 248 and electrical energy supply 29 is connected by a grounded line, GND, of the battery circuit 290.

As illustrated, in the electrical circuitry 24 of the body 2, there is no electrical connection between the battery circuit 290 and the RX/TX circuit 250. Therefore, the battery circuit 290 and thus the electrical energy supply 29 are disconnected from the RX/TX circuit 250.

Similarly, with reference now to FIG. 4B, the electrical circuitry 34 of the head 3 generally comprises a head connector 340 with electrical connection elements 341-348, a head main circuit 349 and a RX/TX circuit 350 connecting the body connector 240 and the body main circuit 249.

The head main circuit 349 comprises the control system 31, the data storage element 32 and the processor element 36.

In the RX/TX circuit 350: Connection element 341 and head main circuit 349 is connected by line RX2; connection element 342 and head main circuit 349 is connected by line RX1; connection element 343 and head main circuit 349 is connected by line TX2; connection element 344 and head main circuit 349 is connected by line TX1; connection element 347 and head main circuit 349 is connected by a supply line, SUPPLY; and connection element 348 and head main circuit 349 is connected by a grounded line, GND.

Furthermore and as illustrated, in the RX/TX circuit 350 of the electrical circuitry 34 of the head 3, connection element 346 is connected to the ground line, GND, connecting connection element 348 and head main circuit 349. Likewise, connection element 345 is connected to the supply line, SUPPLY connecting connection element 347 and head main circuit 349.

The body connector 240 and the head connector 340 are arranged in such a way in the body 2 and the head 3, respectively, that when the head 3 is connected to the body 2, the body connector 240 and the head connector 340 are likewise connected to one another. When the body connector 240 and the head connector 340 are connected, the above-described configuration of the electrical circuitry 24 of the body 2 and the electrical circuitry 34 of the head 3, respectively, ensures that an electrical connection is formed between on the one hand the ground lines, GND, of the electrical circuitry 24 of the body 2 and the ground line, GND, of the electrical circuitry 34 of the head 3, and on the other hand the supply lines, SUPPLY, of the electrical circuitry 24 of the body 2 and the supply line, SUPPLY, of the electrical circuitry 34 of the head 3, thereby allowing supply of electrical energy to the body main circuit 249 and the head main circuit 349.

In other words, an electrical current from the electrical energy source 29 is caused to flow through at least a part of the electrical circuitry 34 of the head 3 and through at least a part of the electrical circuitry 24 of the body 2 before being delivered to the control system 31 and/or the drive system 21. Thus, the head 3 and the body 2 must be properly connected before the robot 1 is able to be turned on and work.

Figure 5:
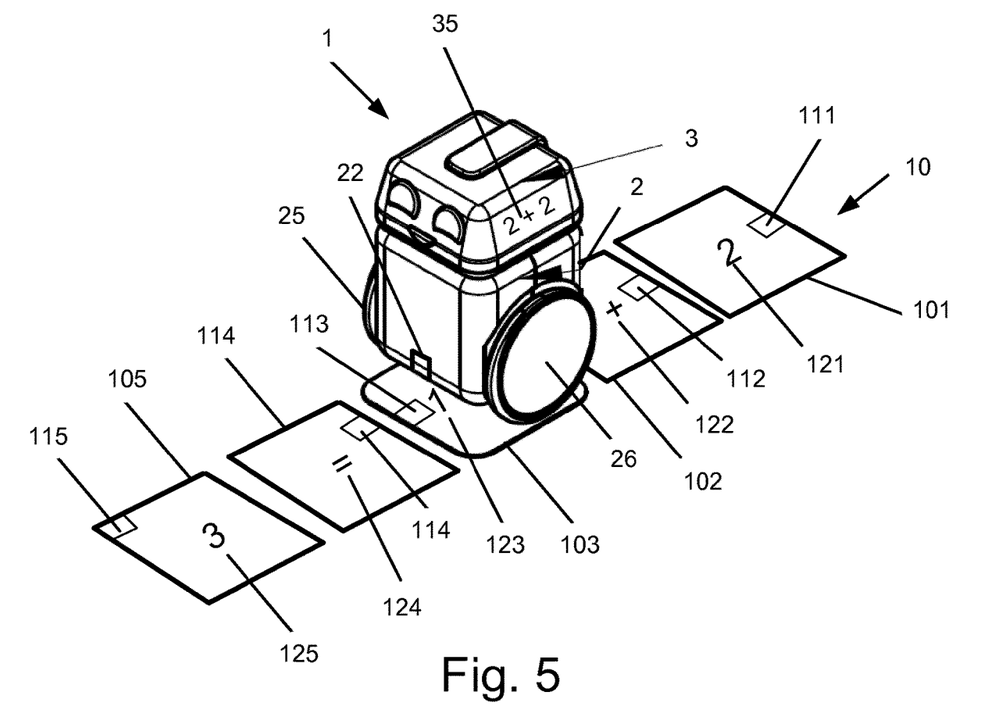
FIG. 5 shows a schematic perspective view of an educational kit according to the second aspect of the invention and comprising a programmable robot for educational purposes according to the first aspect of the invention and a plurality of information carrying elements.
Figure 6:
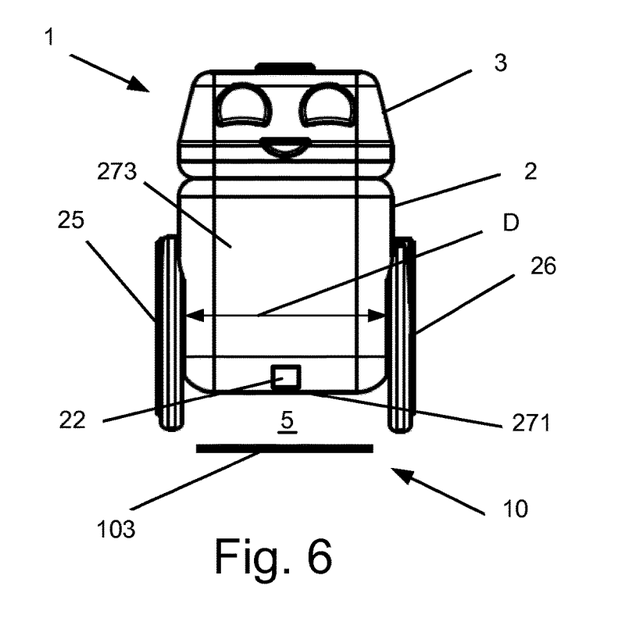
FIG. 6 shows a schematic front view of the educational kit according to FIG. 5.

Finally, FIG. 5 illustrates schematically an embodiment of an educational kit according to the invention. The educational kit generally comprises at least one group 10 of information carrying elements 101, 102, 103, 104, 105 comprising information, and a robot 1 as described above with reference to FIGS. 1 to 4 and comprising a body 2 and at least one head 3.

A group of information carrying elements according to the invention may comprise any number of information carrying elements. In the embodiment shown, the group 10 of information carrying elements comprises five information carrying elements 101-105.

The at least one group 10 of information carrying elements 101-105 comprises information relating to a given education topic, in the embodiment shown mathematics, or more specifically the mathematical discipline addition.

The at least one group 10 of information carrying elements 101-105 may also comprise an information carrying element with start information instructing, when registered and processed by the robot 1, the robot 1 to start and/or an information carrying element with end information instructing, when registered and processed by the robot 1, the robot 1 to stop.

In embodiments where the educational kit comprises a plurality of groups 10 of information carrying elements 101-105, each group of information carrying elements may comprise information relating to a given education topic. An educational kit according to the invention may comprise a plurality of heads 3 for the robot 1 and thus, in a particular embodiment, several matching sets of heads 3 for the robot 1 and information carrying elements 101-105.

Each information carrying element 101-105 of the at least one group 10 of information carrying elements comprises a tag 111-115, respectively. The respective tags 111-115 are adapted for being read or registered by the information acquisition device 22 of the robot 2 to acquire information from the information carrying element 101-105, when the information acquisition device 22 comprises or is a suitable near field communication device, e.g. an RFID-reader or a bar code reader. Such a tag 111-115 may for instance be an RFID-tag, a bar code or another type of near field communication tag. The information thus acquired by the information acquisition device 22 of the robot 2 is configured to enable the processor element 36 of the robot 1 to identify one or more instructions based on the information and/or to allow the robot 1 to distinguish the information carrying element 101-105 and/or the type of information carrying element 101-105, such as the educational topic and/or type of instruction to which the information carrying element 101-105 is related, within the at least one group 10 of information carrying elements. Such information is typically a data string stored in the tag 111-115 of the information carrying element 101-105.

The respective tags 111-115 may furthermore be adapted for receiving information such as to allow the robot 1 to write information to the tags 111-115 by means of the information acquisition device 22.

Alternatively or additionally, when the information acquisition device 22 is or comprises a sensor element, each information carrying element 111-115 of the at least one group 10 of information carrying elements comprises information 121-125, respectively, being measurable by the sensor element. The respective information 121-125 is furthermore configured to enable the processor element 36 of the robot 1 to identify one or more instructions based on the information 121-125 and/or to allow the robot 1 and/or a user to distinguish the information carrying element 101-105 and/or the type of information carrying element 101-105, such as the educational topic and/or type of instruction to which the information carrying element 101-105 is related, within the at least one group 10 of information carrying elements. Such information 121-125 may for instance be text, numbers, symbols or colors printed on the information carrying element 101-105. Suitable sensor elements are thus color sensors, OCR-devices and image capturing devices.

The person skilled in the art realizes that the present invention by no means is limited to the preferred embodiments described above. On the contrary, many modifications and variations are possible within the scope of the appended claims.

The invention claimed is:

1. A programmable robot for educational purposes comprising:
    a body comprising:
        a drive system adapted for, in operation, causing said robot to move,
        at least one information acquisition device configured to acquire information from an external information carrying element,
        and a first connection element; and
    a head comprising:
        a control system, the control system comprising:
            a data storage element, and
            a processor element, the processor element being configured to receive a data signal transmitted from the at least one information acquisition device, the data signal comprising the acquired information from the external information carrying element, to process the data signal, where required using data stored in the data storage element, to interpret the information and achieve one or more instructions, and to cause the drive system to move the robot in accordance with the one or more instructions, and a second connection element, wherein the body and the head are adapted to be detachably coupled to one another by connecting the first connection element and the second connection element to one another, and
    an electrical energy source for supplying an electrical current to the control system, wherein the body further comprises electrical circuitry, wherein the head further comprises electrical circuitry, and wherein the electrical circuitry of the body and the electrical circuitry of the head is configured in such a way that an electrical current from the electrical energy source is caused to flow through at least a part of the electrical circuitry of the head and through at least a part of the electrical circuitry of the body before being delivered to the control system.

2. The programmable robot according to claim 1, wherein the data storage element of the control system of the head comprises data stored thereon relating to a predetermined education topic.

3. The programmable robot according to claim 1, wherein at least one of:
    the first connection element and the second connection element are configured and arranged such that the head may be mounted in only one pre-determined orientation on the body;
    one of the first connection element and the second connection element comprises at least one magnet, and wherein the other of the first connection element and the second connection element comprises a metallic element attracted to magnets and/or at least one magnet; or
    the first connection element and the second connection element are mutually matching male and female components of a snap locking, click locking, or frictionally locking connection.

4. The programmable robot according to claim 1, wherein the body further comprises a set of wheels arranged on mutually opposite sides of the body and coupled to the drive system, and wherein the information acquisition device is arranged between the set of wheels on an underside of the body such as to enable the information acquisition device to scan an area between the set of wheels below the underside of the body.

5. The programmable robot according to claim 1, wherein at least one of:
    the information acquisition device comprises a sensor device and/or a near field communication device, or
    the head comprises a feedback device.

6. The programmable robot according to claim 5, wherein the first connection element and the second connection element are configured and arranged such that the head may be mounted in only one pre-determined orientation on the body.

7. The programmable robot according to claim 5, wherein at least one of the first connection element and the second connection element is a magnet.

8. The programmable robot according to claim 5, wherein the first connection element and the second connection element are cooperating elements of a snap locking, click locking, or frictionally locking connection.

9. The programmable robot according to claim 1, wherein the first connection element and the second connection element are configured and arranged such that the head may be mounted in only one pre-determined orientation on the body.

10. The programmable robot according to claim 1, wherein at least one of the first connection element and the second connection element is a magnet.

11. The programmable robot according to claim 1, wherein the first connection element and the second connection element are cooperating elements of a snap locking, click locking, or frictionally locking connection.

12. An educational kit comprising:
  at least one group of information carrying elements comprising information, and
  a robot comprising:
    a body comprising a drive system adapted for, in operation, causing said robot to move, at least one information acquisition device configured to acquire the information from the at least one group of information carrying elements, and a first connection element, and
      a head comprising a control system, the control system comprising a data storage element and a processor element, the processor element being configured to receive a data signal transmitted from the at least one information acquisition device, the data signal comprising the acquired information from the external information carrying element, to process the data signal, where required using data stored in the data storage element, to interpret the information and achieve one or more instructions, and to cause the drive system to move the robot in accordance with the one or more instructions, and a second connection element, wherein the body and the head are adapted to be detachably coupled to one another by connecting the first connection element and the second connection element to one another, and
    an electrical energy source for supplying an electrical current to the control system, wherein the body further comprises electrical circuitry, wherein the head further comprises electrical circuitry, and wherein the electrical circuitry of the body and the electrical circuitry of the head is configured in such a way that an electrical current from the electrical energy source is caused to flow through at least a part of the electrical circuitry of the head and through at least a part of the electrical circuitry of the body before being delivered to the control system.

13. The educational kit according to claim 12, wherein the data storage element of the control system of the head of the robot comprises data stored thereon relating to a predetermined education topic.

14. The educational kit according to claim 12, wherein the at least one group of information carrying elements comprise information relating to a given education topic; or
  wherein the educational kit further comprises a plurality of groups of information carrying elements, and wherein each group of information carrying elements comprise information relating to a given education topic.

15. The educational kit according to claim 12, wherein at least one of:
  the first connection element and the second connection element are configured and arranged such that the head may be mounted in only one pre-determined orientation on the body;
  one of the first connection element and the second connection element comprises at least one magnet, and wherein the other of the first connection element and the second connection element comprises a metallic element attracted to magnets and/or at least one magnet; or
  the first connection element and the second connection element are mutually matching male and female components of a snap locking, click locking, or frictionally locking connection.

16. The educational kit according to claim 12, wherein the body of the robot further comprises a set of wheels coupled to the drive system and arranged on mutually opposite sides of the body and spaced apart with a distance being any one of:
  larger than a width of the information carrying elements of the at least one group of information carrying elements,
  equal to a width of the information carrying elements of the at least one group of information carrying elements, or
  smaller than a width of the information carrying elements of the at least one group of information carrying elements, such as equal to the width of the information carrying elements of the at least one group of information carrying elements minus the combined thickness of the set of wheels; and
  wherein the information acquisition device is arranged between the set of wheels on an underside of the body such as to enable the information acquisition device to scan an area between the set of wheels below the underside of the body.

17. The educational kit according to claim 12, wherein at least one of:
  each information carrying element of the at least one group of information carrying elements comprise a tag, and wherein the information acquisition device of the robot comprises a near field communication device configured to register the tag,
  the information acquisition device of the robot comprises a sensor element, and wherein each information carrying element of the at least one group of information carrying elements comprise information measurable by the sensor element and configured to enable the processor element of the robot to identify one or more instructions based on the information and/or to distinguish the information carrying element and/or the type of information carrying element within the at least one group of information carrying elements, or
  the head of the robot comprises a feedback device.

18. The educational kit according to claim 12, wherein the educational kit further comprises a plurality of interchangeable heads for the robot, each of the plurality of heads comprising a data storage element and a processor element, the processor element being configured to receive a data signal transmitted from the at least one information acquisition device, the data signal comprising the acquired information from the external information carrying element, to process the data signal, where required using data stored in the data storage element, to interpret the information and achieve one or more instructions, and to cause the drive system to move the robot in accordance with the one or more instructions, and a second connection element, and wherein each of the plurality of heads are adapted to be detachably coupled, one at a time to the body by connecting the first connection element and the second connection element to one another.

19. The educational kit according to claim 12, wherein the educational kit further comprises a plurality of interchangeable heads for the robot, each of the plurality of heads comprising a data storage element and a processor element, the processor element being configured to receive a data signal transmitted from the at least one information acquisition device, the data signal comprising the acquired information from the external information carrying element, to process the data signal, where required using data stored in the data storage element, to interpret the information and achieve one or more instructions, and to cause the drive system to move the robot in accordance with the one or more instructions, and a second connection element, and wherein the data storage element of the control system of each of the plurality of heads comprises information stored thereon relating to a predetermined education topic.

\* \* \* \* \*